May 8, 1945.   A. A. CADWALLADER   2,375,728
COUPLING DEVICE
Filed April 20, 1942
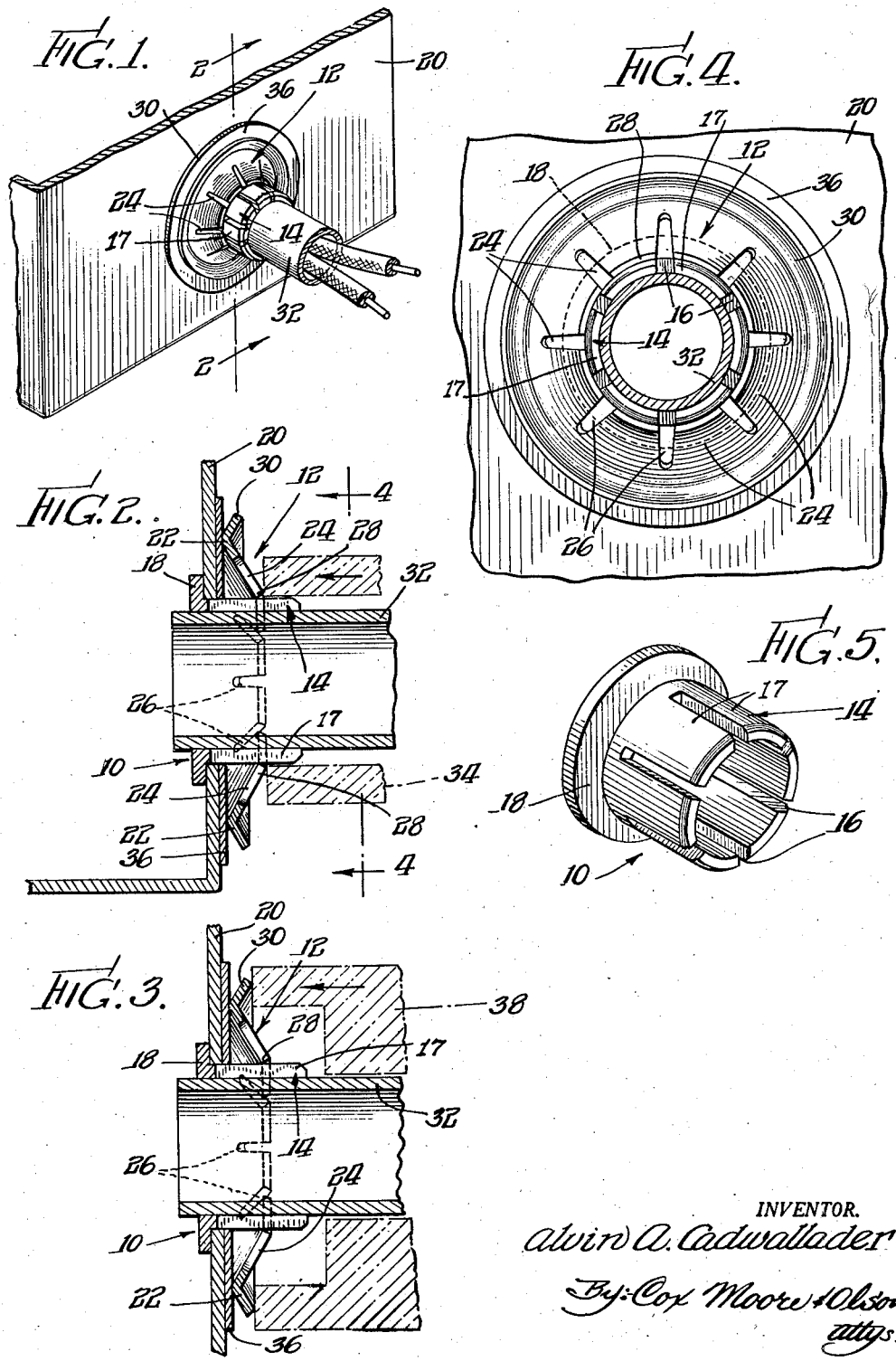
INVENTOR.
Alvin A. Cadwallader
By: Cox Moore & Olson
attys.

Patented May 8, 1945

2,375,728

UNITED STATES PATENT OFFICE 2,375,728

COUPLING DEVICE

Alvin A. Cadwallader, Oakford, Pa., assignor to Illinois Tool Works, Chicago, Ill., a corporation of Illinois Application April 20, 1942, Serial No. 439,681

2 Claims. (Cl. 285—6.5)

This invention relates generally to outlet devices and more particularly to devices for establishing communication with the interior or chamber of electrical outlet boxes and the like.

It has been common practice to direct electrical conductors into association with outlet boxes by the use of metallic sheathing or tubes. The extremity of the sheathing or tube in the vicinity of the outlet box is usually coupled with said box by the use of an internally threaded member mounted in the opening of the outlet box which is designed to receive the threaded extremity of the sheathing. In addition, it has also been common practice to employ a nut for securing the aforesaid internally threaded member within the outlet box. The present invention has for its main object the presentation of a coupling device for outlet boxes and the like which is of much simpler construction and may be more economically produced than the devices which have heretofore been available. To this end the invention contemplates the elimination of all prethreaded coupling parts and proposes the use of sheet metal parts which may be detachably secured in place with a minimum amount of effort and skill.

More specifically, the invention contemplates a coupling arrangement for outlet boxes and the like having two main elements, to-wit, a sleeve member and a sheet metal fastener therefor, said parts being designed to cooperate in securing conductor sheathing or tubing against longitudinal separation from the sleeve.

It is a further object to provide a device as set forth above wherein the sleeve member is sufficiently resilient to permit of its being sprung into gripping association with the periphery of a tubular member such as sheathing for electrical conductors.

Still a further object of the present invention is to provide a coupling device as set forth above wherein the sleeve member and sheet metal fastener may be telescopically associated for locking purposes by the application of pressure upon the sheet metal fastener in an axial direction and wherein these parts may be disassembled with equal ease by the application of force in an axial direction along the outer margin of the sheet metal fastener.

The foregoing and other objects and advantages will be apparent from the following detailed description when consideration is given to the accompanying drawing wherein—

Figure 1 is a perspective view disclosing the invention as applied to the wall of an outlet box;

Figure 2 is a transverse sectional view taken substantially along the line 2—2 of Figure 1, a tool for securing the sheet metal locking member in position being shown by dot and dash lines;

Figure 3 is a view similar to Figure 2 disclosing the manner in which a tool indicated by dot and dash lines may be employed to engage the outer margin of the sheet metal fastening device for releasing the inner margin from a sleeve member;

Figure 4 is an elevational view of the coupling device contemplated by the present invention, said view being taken substantially along the line 4—4 of Figure 2; and Figure 5 is a perspective view of the sleeve or collet member which serves to secure the extremity of flexible sheathing or tubing to an outlet box.

In the drawing one practical embodiment of the invention is illustrated and this embodiment includes a sleeve member designated generally by the numeral 10 and a sheet metal locking member designated generally by the numeral 12. The sleeve member 10 includes a portion 14 which is provided with a plurality of equally spaced slits 16 separating resilient axially extending prongs 17. This construction renders the sleeve portion 14 resilient so that it may function as a fastening collet when pressure is exerted against the periphery thereof. The opposite extremity of the sleeve 10 is provided with an abutment flange 18 which engages the inner surface of an outlet box wall 20, as illustrated in Figures 2 and 3. In use, the sleeve or collet member 10 is inserted within a complementary aperture of the outlet box wall, the resilient portion of the sleeve projecting beyond the outer surface structure of the wall 20.

The sheet metal locking member 12 is centrally apertured to accommodate the resilient prongs 17 of the sleeve portion 14, as clearly illustrated in Figure 2. This sheet metal locking member 12 includes an intermediate annular body portion 22, one surface of which is adapted to bear against the outer surface structure of the wall 20. Extending radially inwardly from the intermediate body portion 20 and diverging from the plane defined by the work engaging surface of said intermediate body is a plurality of resilient prongs 24 separated by radial slots 26. The inner extremities of these prongs 24 present teeth 28 adapted to engage the outer periphery of the sleeve portion 14. Extending outwardly from the intermediate body portion 22 and diverging from the plane of the work surface is an outer body portion or rim 30.

After the sleeve 10 and the sheet metal fastening device 12 have been telescopically associated, the flexible sheathing or tubing 32 which is to be coupled with the wall 20 is inserted within the sleeve member 10. The normal internal diameter of the sleeve member 10 is substantially the same as the external diameter of the sheathing 32 so as to permit an initial snug fit between the parts. After the parts have been thus assembled, pressure in an axial direction toward the wall 20 is exerted against the prongs 24 as by means of a suitable tool 34, Figure 2. This causes the teeth 28 to lockingly engage the periphery of the sleeve portion 14 and simultaneously urges the resilient stock or prongs 17 of the sleeve portion 14 between the slots 16 toward the axis of the sleeve and consequently into frictional gripping association with the periphery of the sheathing 32. This frictional grip between the sleeve 10 and the tubing 32 is sufficient to secure the tubing against axial dislodgment and also prevents the sleeve 10 from being displaced inwardly with respect to the outlet box. In instances where it is desirable, an auxiliary plate or disc 36 is interposed between the outer surface of the wall 20 and the clamping side of the intermediate body portion 22, as illustrated in the drawing. However, where surface conditions are such as to enable the sheet metal locking member to bear directly against the outer surface of the wall, the disc 36 may be eliminated.

When the above mentioned coupling parts function as described, the sheathing or tubing 32 is firmly coupled with the outlet box wall 20 and cannot be withdrawn therefrom until the teeth 28 are released from the sleeve 10. The release of the teeth 28 from the resilient sleeve portion 14 may be accomplished by applying pressure to the outer margin of the rim 30, as illustrated in Figure 3. A suitable pressure tool 38, indicated by dot and dash lines, Figure 3, may be employed for this purpose. When this tool is brought into engagement with the outer margin of the rim 30, the prongs 24 are swung away from the sleeve, or move as an arm of a bell crank. This causes the release of the locking teeth 28 and consequently the release of the resilient sleeve portion 14 from the tubing 32.

The foregoing simple coupling device should be distinguished from screw and nut arrangements which have heretofore been employed. The present invention contemplates coupling elements which may be stamped and formed from sheet material and which need not be threaded. As such these constituent elements of the coupling device may be produced at extremely low cost. Also, due to the fact that the assembly of the parts requires only a simple telescopic operation, the ease with which the coupling may be effected is greatly facilitated. It is preferred to form the sheet metal locking member from suitable sheet metal spring stock which may be hardened and tempered to the required degree. When the tightening tool is applied, as illustrated in Figure 2, a set is imparted to the sheet metal locking device which causes said device to firmly and securely retain the sleeve in position. Likewise, when the releasing tool is applied, as illustrated in Figure 3, the stock of the sheet metal fastener is subjected to another set which retains the associated parts in released or disengaged relation.

For the purpose of illustrating one practical embodiment of the invention, certain detailed structural features have been disclosed and described herein but obviously the invention is capable of other modifications and changes without departing from the spirit and scope of the appended claims.

The invention is hereby claimed as follows:

1. A coupling device for outlet boxes and the like comprising a sleeve member adapted for insertion within the aperture of a wall structure, means for securing said sleeve member against outward axial displacement with respect to a wall structure, resilient means associated with said sleeve member adapted to be sprung inwardly for grippingly engaging the peripheral surface of an elongated member within the sleeve, and a sheet metal locking device including an inner marginal section having a resilient tooth for lockingly engaging the peripheral surface of said sleeve member to secure said sleeve against inward axial displacement and to effect the springing of the resilient means toward the axis of the sleeve, said locking device also including a body portion supporting said resilient locking tooth and having a surface area for engaging the outer surface structure of a wall.

2. A coupling device for outlet boxes and the like comprising a sleeve member adapted for insertion within the aperture of a wall structure, means for securing said sleeve member against outward axial displacement with respect to a wall structure, a portion of said sleeve member being severed to provide a collapsible collet adapted when sprung inwardly to grippingly engage the peripheral surface of an elongated member within the sleeve, and a sheet metal locking device including an inner marginal section for lockingly engaging the peripheral surface of the collet portion of the sleeve to secure said sleeve against inward axial displacement and to cause said collet portion to be urged towards the axis of the sleeve, said locking device also including a body portion having a surface area for engaging the outer surface structure of a wall.

ALVIN A. CADWALLADER.